(12) United States Patent
Nakajima et al.

(10) Patent No.: US 8,634,600 B2
(45) Date of Patent: Jan. 21, 2014

(54) EXTRACTING METHOD AND APPARATUS OF BLOOD VESSEL CROSSING/BRANCHING PORTION

(75) Inventors: Junko Nakajima, Tokyo (JP); Norihiko Utsunomiya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/874,939

(22) Filed: Sep. 2, 2010

(65) Prior Publication Data
US 2011/0058718 A1 Mar. 10, 2011

(30) Foreign Application Priority Data
Sep. 10, 2009 (JP) ................. 2009-209387

(51) Int. Cl.
*G06K 9/00* (2006.01)
(52) U.S. Cl.
USPC .......................... 382/117; 382/128
(58) Field of Classification Search
None
See application file for complete search history.

(56) References Cited

U.S. PATENT DOCUMENTS

2004/0208343 A1* 10/2004 Golden et al. ............... 382/110

FOREIGN PATENT DOCUMENTS

| CN | 1378166 A | 11/2002 |
|----|-----------|---------|
| CN | 101002682 A | 7/2007 |
| JP | 2001-070247 A | 3/2001 |

OTHER PUBLICATIONS

XP03129278 Publication Date: May 13, 2008 Iqbal IvI I et al: "Detection of . . . technique" pp. 241-246.
XP010567107 Publication Date: Oct. 25, 2001 Hayashi J et al:"A development . . . images" pp. 429-438.
Office Action issued on Jun. 20, 2013 in the counterpart Chinese Application No. 201010277174.4.
Office Action issued on Jul. 9, 2013 in counterpart Chinese Application No. 2010010277174.4.

* cited by examiner

*Primary Examiner* — Claire X Wang
(74) *Attorney, Agent, or Firm* — Carter, DeLuca, Farrell & Schmidt LLP (57) ABSTRACT

It is an object of the invention to provide a method of extracting a crossing/branching portion of a blood vessel from a fundus image of the eye at a high probability. The crossing/branching portion of the blood vessel is extracted from the fundus image under such conditions that three or more blood vessels run on an outer circumferential portion of an extraction candidate region and that a coordinate average of a plurality of blood vessels in the outer circumferential portion exists in a center portion of the extraction candidate region.

16 Claims, 5 Drawing Sheets

EXTRACTING METHOD AND APPARATUS OF BLOOD VESSEL CROSSING/BRANCHING PORTION

BACKGROUND OF THE INVENTION

1. Field of the Invention

The present invention relates to extracting method and apparatus of a blood vessel crossing/branching portion and, more particularly, to extracting method and apparatus of a blood vessel crossing/branching portion of a fundus image of the eye.

2. Description of the Related Art

In association with the recent aging society, an early diagnosis of a blood vessel disorder is becoming important in order to improve a QOL of the nation. In order to perform the early diagnosis of the blood vessel disorder, it is desirable that the blood vessel can be easily observed and a fundus photograph of the eye is useful for this purpose.

In a medical treatment using the fundus photograph, information which is clinically important is obtained by observing, particularly, the blood vessel crossing/branching portion of the fundus of the eye. For example, information of imperforation and stricture of the blood vessel crossing portion due to arterial sclerosis or the like is obtained from the blood vessel crossing portion. Information which is important in a blood flow evaluation is obtained from the blood vessel branching portion by, particularly, an observation by a fluorescence fundus photograph of the eye.

Further, when a plurality of fundus images are compared and their aging changes are evaluated, even in the case of accurately position-matching the fundus images to be compared, by extracting the blood vessel crossing/branching portion as a characteristics point, the position matching can be easily performed. Therefore, a technique for automatically extracting the blood vessel crossing/branching portion from the fundus images has been developed.

As a main technique, there is such a technique that a blood vessel is extracted by binarizing a fundus image, the extracted blood vessel is converted into a thin line, and a crossing/branching portion is obtained. However, according to such a technique, there is a problem in which as for the fundus image, since a contrast is low and continuity on the image of the blood vessel is not guaranteed, the extraction itself of the blood vessel is relatively difficult, so that the blood vessel crossing/branching portion cannot be correctly extracted.

Therefore, in the Official Gazette of Japanese Patent Application Laid-Open No. 2001-070247, there is disclosed a method whereby a candidate region is selected from a fundus image and the presence or absence of a blood vessel crossing in the candidate region is detected under such conditions that, in the candidate region, four or more blood vessels pass through its outer circumferential portion and that the blood vessel runs in a center portion of the candidate region. According to such a method, the candidate region is divided into a plurality of square small regions and an average value of pixel values of each small region existing in the outer circumferential portion among them is calculated. Further, a difference between the average values of the adjacent small regions is calculated and a threshold value process is executed, thereby discriminating whether or not the blood vessel passes through the small region. After that, the pixel value of the small region in the outer circumferential portion which has been determined that the blood vessel passes and the pixel value of the small region in the center portion are compared, thereby discriminating whether or not the blood vessel passes through the small region in the center portion.

The technique disclosed in Japanese Patent Application Laid-Open No. 2001-070247 is a useful technique in the case of extracting the blood vessel crossing/branching portion from the fundus image from which it is difficult to extract the blood vessel. However, according to such a technique, if there is a blood vessel running in the center portion of the candidate region and another one blood vessel runs in the candidate region, even when those two blood vessels do not cross, it is erroneously determined that there is a crossing. On the other hand, even when there is a crossing, if at least blood vessel runs in the center portion of the candidate region, an image of such a region is extracted. There is consequently such a problem that an image of a region where a crossing portion does not exist at the center in the candidate region and it is difficult to observe the crossing portion which is important on diagnosis is also extracted.

SUMMARY OF THE INVENTION

In consideration of the above problems, it is an object of the invention to reduce a probability of the foregoing erroneous determination and to extract a region, at a high probability, in which a crossing/branching portion serving as an extracting portion exists in a center portion of the region.

In order to solve the above problems, the invention provides an extracting method of a blood vessel crossing/branching portion for extracting a blood vessel crossing/branching portion from an image including a blood vessel, comprising: a selecting step of selecting an extraction candidate region from the image; a setting step of setting an outer circumferential small region into an outer circumferential portion of the selected extraction candidate region; a number determining step of determining the number of outer circumferential portion blood vessels existing in the set outer circumferential small region; a center portion determining step of determining whether or not a coordinate average of the outer circumferential portion blood vessels is included in a center portion of the extraction candidate region; and an extracting step of extracting the extraction candidate region as a blood vessel crossing/branching portion according to determination results of the number determining step and the center portion determining step.

Further features of the present invention will become apparent from the following description of exemplary embodiments with reference to the attached drawings.

DESCRIPTION OF THE EMBODIMENTS

Exemplary embodiments of the invention will be described in detail hereinbelow with reference to the drawings.

Embodiment 1

Figure 1A:
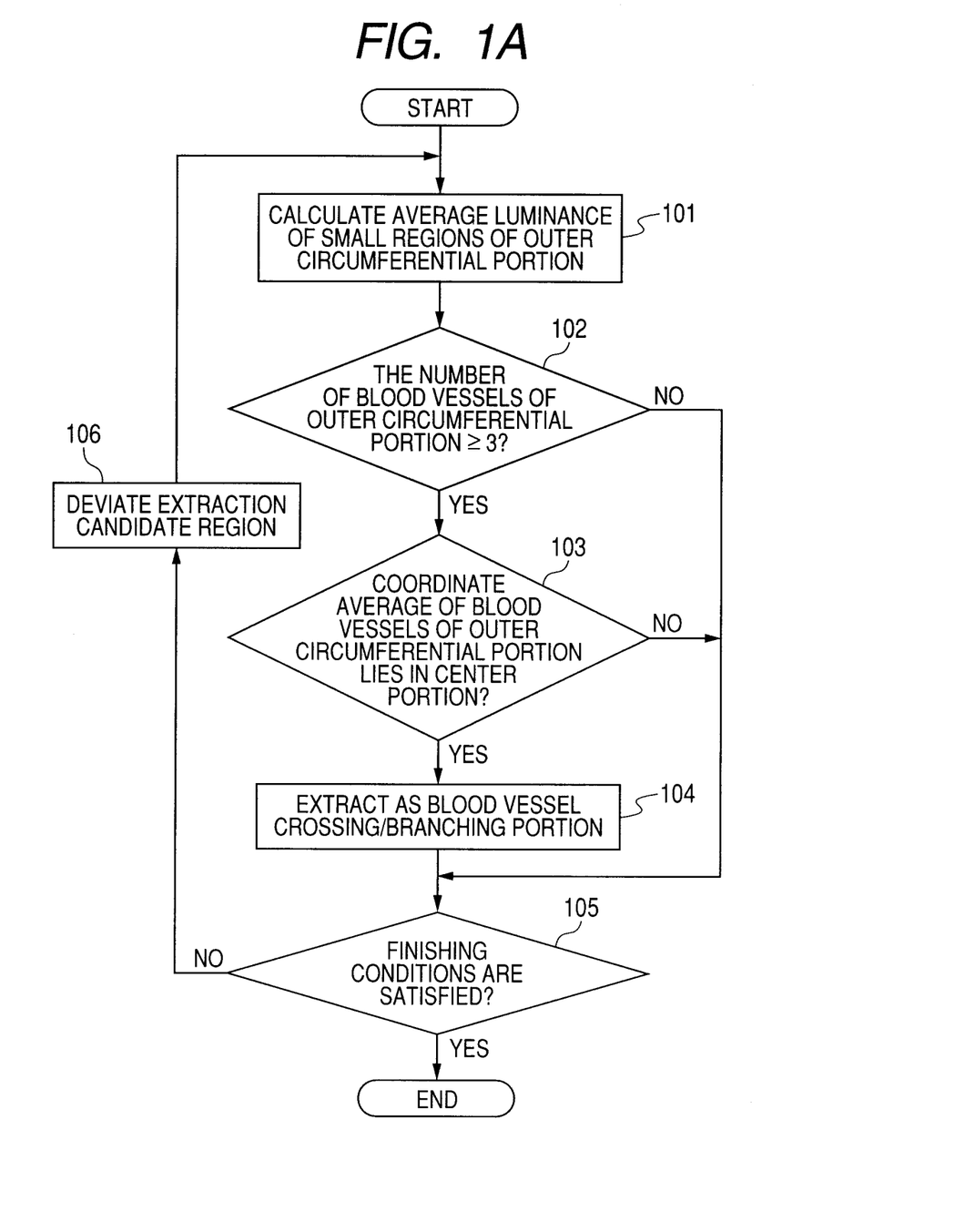
FIG. 1A is a flowchart illustrating a processing flow in the embodiment 1.

A construction of the embodiment will be described with reference to a flowchart of FIG. 1A and a whole constructional diagram of an apparatus which is used in the embodiment illustrated in FIG. 2. In the embodiment, an SLO image photographed by a scanning laser ophthalmoscope (SLO) is converted into digital data of a gray scale and a crossing/branching portion of a blood vessel of a fundus of the eye is extracted from the whole region of the obtained SLO image. The image which is used in the embodiment is not limited to the SLO image but any image such as a fundus photograph of the eye or the like can be used so long as it is a two-dimensional image on which a fundus blood vessel has been projected and a luminance of the blood vessel is smaller than those in other regions.

Figure 2:
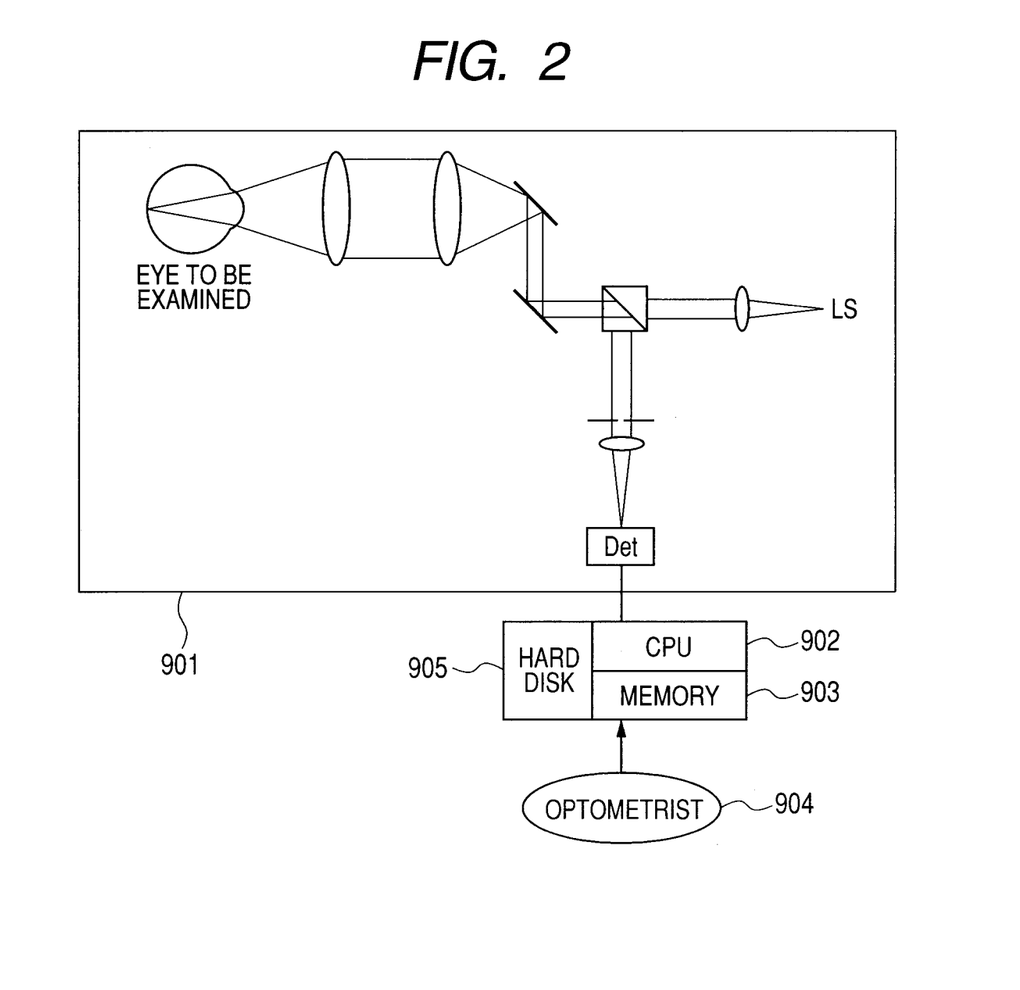
FIG. 2 is a diagram illustrating a hardware construction of the embodiment 1.

FIG. 2 is a constructional diagram of an extracting apparatus of a blood vessel crossing/branching portion for realizing the embodiment. An SLO image pickup system 901 functions as an obtaining unit for obtaining an SLO image by photographing an eye to be examined. Since it can be realized by the existing SLO image pickup system, its construction is simplified and illustrated. A CPU 902 functions as a setting unit, a determining unit, an arithmetic operating unit, and an extracting unit, which will be described hereinafter. The CPU 902, a memory 903, and a hard disk 905 construct an information processing apparatus for realizing the embodiment together with a display apparatus and an input apparatus (not shown). By such a construction, information is presented to an optometrist 904, an instruction from the optometrist 904 is received, and various kinds of information processes are executed. A program for realizing the flowchart of FIG. 1A is stored in the hard disk 905. The CPU 902 reads out the program therefrom and executes it.

A fundus image of the eye which is used here will now be described. The SLO image photographed by the SLO image pickup system 901 is stored into the memory 903 by the CPU 902. A size of SLO image is equal to 2000 pixels (in the vertical direction)×2000 pixels (in the lateral direction). A luminance of the pixel lies within a range from −32768 to 32767. The size of image and the luminance are not limited to those values. However, it is necessary that the size of fundus image is so large to be equal to or larger than such a value that the crossing/branching portion of the blood vessel is located. It is desirable to set a luminance scale to a scale of the nth power of 2 because the subsequent calculation becomes easy. A shape of image which is used is not limited to the square either but may be set to any shape such as rectangle, circle, or the like.

Figure 3A:
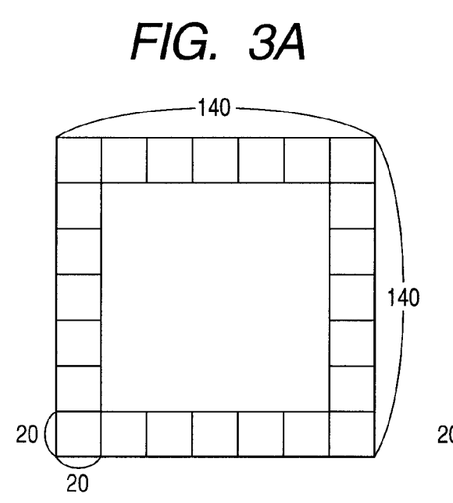
FIGS. 3A, 3B, 3C and 3D are schematic diagrams for describing steps 102 and 103 in the embodiment 1.

A procedure for extracting the blood vessel crossing/branching portion in the embodiment will be described with reference to the flowchart of FIG. 1A. First, the CPU 902 functions as a setting unit, selects a square region locating at a left upper corner of the SLO image as an extraction candidate region, and stores information of this region into the memory. In the subsequent processes, whether or not the crossing/branching portion of the blood vessel exists in the selected extraction candidate region is discriminated. If it is determined that the crossing/branching portion exists, the extraction candidate region is extracted as a blood vessel crossing/branching portion. The optometrist 904 preliminarily decides a size of extraction candidate region and stores into the memory. The size of extraction candidate region is not particularly limited but may be larger than such an area that the blood vessel crossing/branching portion in the image is located. As illustrated in FIG. 3A, in the embodiment, the size of extraction candidate region is set to 140 pixels (in the vertical direction)×140 pixels (in the lateral direction). It is such a minimum size that when the inventor has extracted the blood vessel crossing/branching portion by using the invention and has performed a pattern matching to the SLO image of the same examinee by using the extracted region as a template image, there is no erroneous detection in the pattern matching. A shape of extraction candidate region is not limited to the square either but may be set to any shape such as rectangle, circle, or the like.

Subsequently, step 101 is a step in which the CPU 902 functions as a determining unit, decides an outer circumferential small region, calculates an average value of the luminance of each pixel included in the outer circumferential small region, and stores into the memory 903. First, the CPU 902 continuously sets a square region without a gap along an outer circumferential portion of the selected extraction candidate region according to the size of outer circumferential small region designated by the optometrist 904. Such a square region set along the outer circumferential portion is called "outer circumferential small region" in the embodiment. A shape of the outer circumferential small region is not limited to the square either but may be any shape so long as it can be continuously set along the outer circumference of the extraction candidate region. However, it is necessary that a size of outer circumferential small region in the width direction for the outer circumference of the extraction candidate region is similar to a diameter of blood vessel. In the image of the embodiment, since the diameter of blood vessel is equal to about 20 pixels, the optometrist 904 decides the size of outer circumferential small region to pixels (in the vertical direction)×20 pixels (in the lateral direction) and stores into the memory 903 by inputting from an input apparatus (not shown).

FIG. 3A illustrates the extraction candidate region extracted by the CPU 902 and the outer circumferential small region in the embodiment. A size of extraction candidate region is equal to 140×140 pixels. 24 outer circumferential small regions each having a size of 20×20 pixels are set in the outer circumferential portion.

Figure 3B:
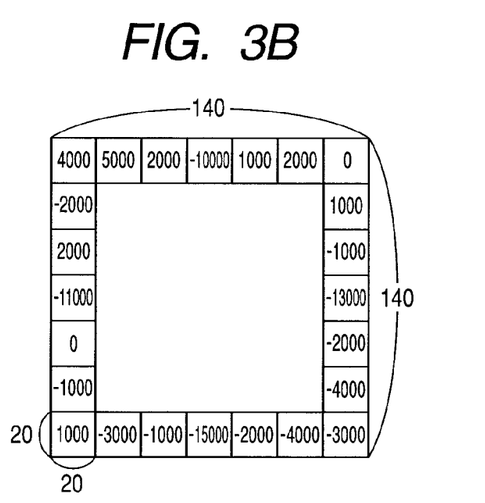

Subsequently, the CPU 902 averages the luminance values of all pixels included in each outer circumferential small region and stores the average value into the memory 903 as a value representing each outer circumferential small region (hereinbelow, such a value is also referred to as "luminance average value"). FIG. 3B illustrates its conceptual diagram.

Figure 3C:
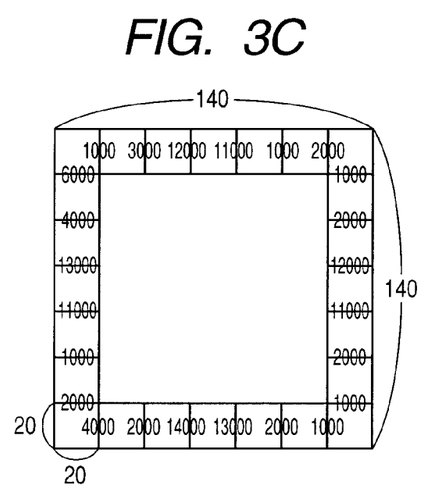

Step 102 is a number determining step in which the CPU 902 discriminates whether or not the blood vessel runs at three or more positions in the outer circumferential small region. First, the CPU 902 obtains an absolute value of a difference between the luminance average values of the adjacent outer circumferential small regions and stores into the memory 903. Its conceptual diagram is illustrated in FIG. 3C. After that, the CPU 902 compares the absolute value of the difference between the luminance average values of the adjacent outer circumferential small regions with a first threshold value A and compares a smaller one of the luminance average values of the adjacent outer circumferential small regions with a second threshold value B. If the absolute value of the difference between the luminance average values of the adjacent outer circumferential small regions is equal to or larger than the first threshold value A and the smaller one of the luminance average values of the adjacent outer circumferential small regions is equal to or smaller than the second threshold value B, it is decided that the blood vessel runs in the outer circumferential small region represented by the smaller luminance average value.

The optometrist 904 can arbitrarily decide the first threshold value A and the second threshold value B. In the embodiment, the optometrist 904 determines that the first threshold value A is equal to 8000 and the second threshold value B is equal to −10000. Therefore, it is determined from FIGS. 3B and 3C that the blood vessel runs in the outer circumferential small regions painted in black in FIG. 3D.

Subsequently, the CPU 902 discriminates whether or not there are three or more outer circumferential small regions in which the blood vessel runs. If it is determined that there are three or more outer circumferential small regions in which the blood vessel runs, the CPU 902 advances to step 103. If the number of outer circumferential small regions in which the blood vessel runs is smaller than 3, the CPU 902 advances to a process of step 105.

Step 103 is a center portion determining step in which the CPU 902 functions as an arithmetic operating unit and discriminates whether or not a coordinate average of the outer circumferential portion blood vessel lies within a range of a center portion. In the embodiment, "outer circumferential portion blood vessel" denotes a blood vessel in the outer circumferential small region which has been determined in step 102 by the CPU 902 that the blood vessel runs. If two blood vessels exist in the extraction candidate region and cross each other, it is considered that the center of the crossing of the blood vessels exists at a position (coordinate average) where the coordinates of the outer circumferential portion blood vessels in the extraction candidate region have been averaged. Therefore, by selecting and extracting such an extraction candidate region that the coordinate average exists in the center portion of the extraction candidate region, a possibility that the crossing portion exists in the center portion of the extracted image rises.

The CPU 902 obtains position coordinates of the center of gravity of the outer circumferential portion blood vessel by using the coordinate position in the extraction candidate region of each of the plurality of outer circumferential small regions where the outer circumferential portion blood vessel runs. That is, position coordinate values of the outer circumferential small regions where all outer circumferential portion blood vessels run are added every X axis and every Y axis and each of addition values is divided by the number of outer circumferential small regions where the outer circumferential portion blood vessels run, thereby obtaining the coordinate average of the outer circumferential portion blood vessels.

In the embodiment, "center portion" denotes a square region in the extraction candidate region having the same center of gravity as that of the extraction candidate region and having a predetermined area. Although the area of the center portion can be arbitrarily decided, if it is a region having such a size that a length of one side is equal to or less than ⅕ (is equal to or larger than ⅑) of the extraction candidate region (region which occupies an area which is equal to or less than 1/25 and is equal to or larger than 1/81 of the whole extraction candidate region), it is desirable because the erroneous determination is improved (FIG. 4A).

Figure 4A:
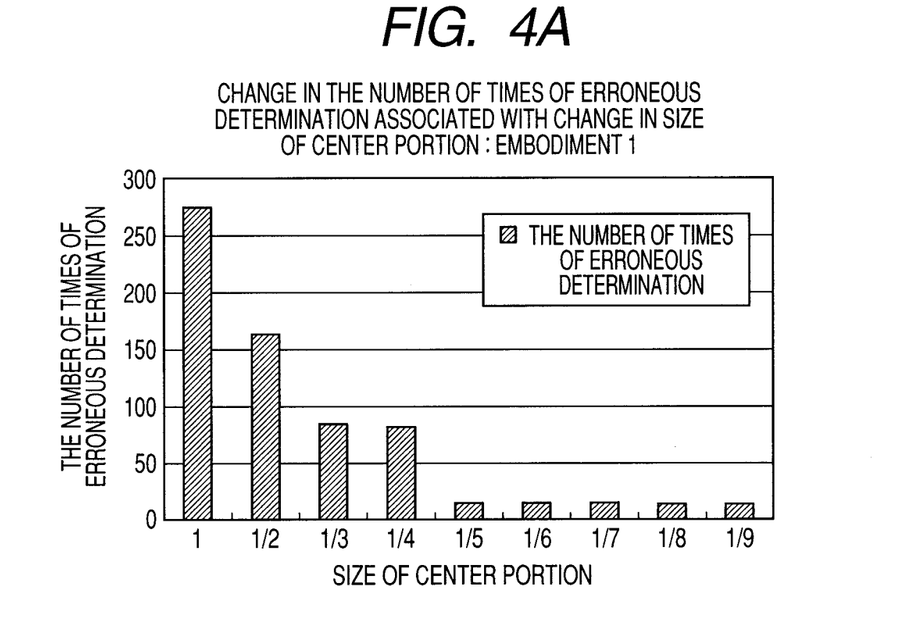
FIG. 4A is a graph illustrating the number of times of erroneous determination depending on a size of center portion in step 103 in the embodiment 1.

An axis of abscissa in FIG. 4A indicates a size of center portion to the extraction candidate region when assuming that the length of one side of the extraction candidate region is equal to 1, in which such a size is shown by a ratio of the length of one side of each square. For example, when the size of center portion shown on the axis of abscissa is equal to ½, each side of the square of the center portion is equal to ½ of the extraction candidate region. Therefore, the center portion becomes a region which occupies ¼ of the area of the extraction candidate region. An axis of ordinate in FIG. 4A indicates the number of extraction candidate regions in which the crossing/branching portion of the blood vessel is not recognized by a visual inspection (the number of times of erroneous determination) among the extraction candidate regions extracted as crossing/branching portions of the blood vessel from the equal SLO image in the center portion of each size. In the embodiment, the optometrist 904 determines that the length of one side of the center portion is equal to ⅐ of the extraction candidate region.

If the average coordinates of the outer circumferential portion blood vessels are included in the region of the center portion, the processing routine advances to a process of step 104. The CPU 902 functions as an extracting unit and extracts the extraction candidate region as a crossing/branching portion of the blood vessel. If the average coordinates of the outer circumferential portion blood vessels are not included in the region of the center portion, the CPU 902 determines that the blood vessel crossing/branching portion does not exist in the extraction candidate region, so that the extraction candidate region is not extracted. In this case, the CPU 902 advances to step 105.

Figure 3D:
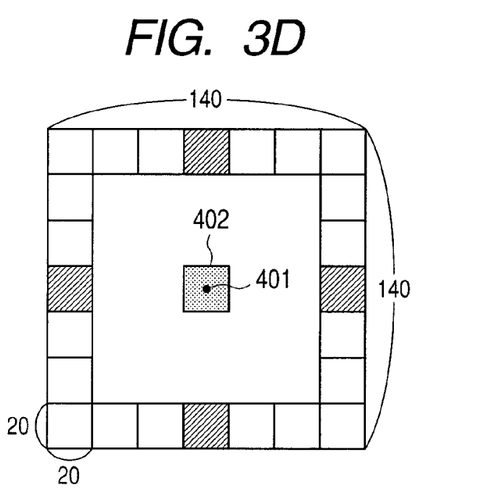

In the example of FIGS. 3A to 3D of the embodiment, since it is determined that the outer circumferential portion blood vessels are distributed as illustrated in FIG. 3D as mentioned above, a coordinate average 401 of the outer circumferential portion blood vessels is included in the region of a center portion 402 of the extraction candidate region. Therefore, the CPU 902 determines that a discrimination result of step 103 is YES, and extracts the extraction candidate region as a region including the blood vessel crossing/branching portion in next step 104.

After that, the CPU 902 advances to step 105. In step 105, the CPU 902 discriminates whether or not a finishing condition is satisfied. The optometrist can arbitrarily decide the finishing condition. In the embodiment, "whether all of the fundus images have been scanned" is assumed to be the finishing condition. When the CPU 902 determines that the present status does not satisfy the finishing condition, the extraction candidate region is deviated (step 106) and the processing routine is returned to the process of step 101. The optometrist 904 can arbitrarily decide the number of pixels which are deviated here. In the embodiment, it is assumed that the extraction candidate region is deviated one pixel by one to the right on the image, when the region reaches a right edge of the image, the extraction candidate region is deviated by one pixel in the downward direction and is returned to the left edge of the image, and the processing routine is again returned to the process of step 101.

Until the CPU 902 determines that the finishing condition (in the embodiment, "whether all of the fundus images have been scanned") is satisfied, while deviating the extraction candidate region (step 106), the CPU 902 repeats the processes and discriminating processes in steps 101 to 105 and scans the fundus image. The processing routine is finished at timing when the CPU 902 determines that the finishing condition is satisfied (in the embodiment, all of the fundus images have completely been scanned).

It is also possible to construct in such a manner that if none of the regions which can satisfy the condition is extracted in step 104 until the finishing condition is satisfied, a region which is closest to the condition is stored into the memory 903 after the discrimination result of NO in step 103 was obtained, and the region is extracted, or the condition is relaxed and the processes are executed again from the beginning.

By executing the foregoing processes, a probability that when the blood vessel which passes through the center portion of the extraction candidate region exists, the region where a portion other than the crossing/branching portion has erroneously been determined as a crossing/branching portion is extracted is reduced. Such a probability that the region where the center of the crossing/branching portion of the blood vessel exists in the center portion of the extraction region is extracted can be raised.

Embodiment 2

An embodiment 2 is constructed by presuming that in the extracting method of the crossing/branching portion shown in the embodiment 1, the blood vessel passes through the center portion of the extraction candidate region as an extracting condition.

Figure 1B:
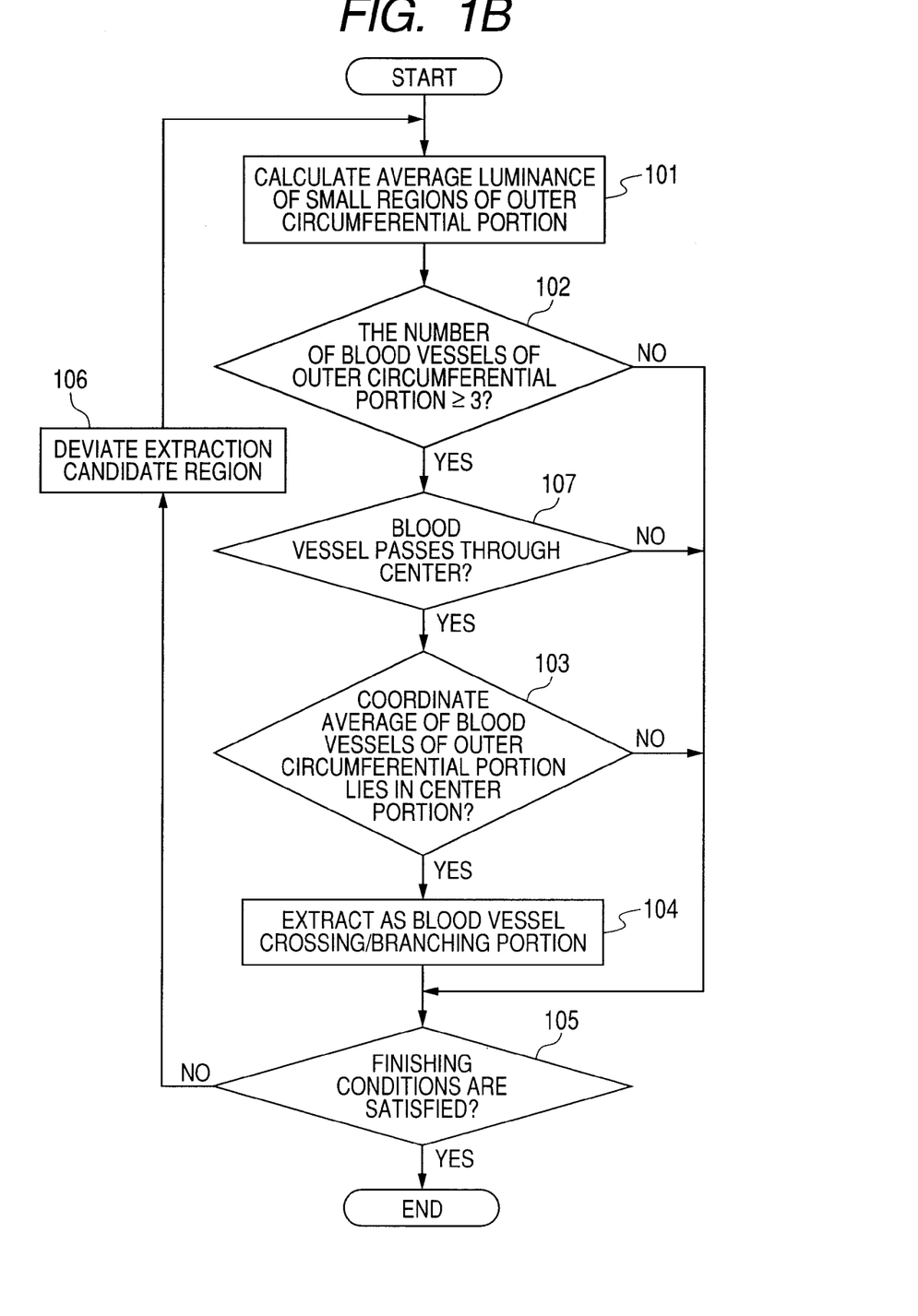
FIG. 1B is a flowchart illustrating a processing flow in the embodiment 2.

The embodiment 2 will be described with reference to a flowchart of FIG. 1B. The apparatus illustrated in FIG. 2 is also used in this embodiment. Since a construction of the apparatus is similar to that in the embodiment 1, its description is omitted. An SLO image is the same as that used in the embodiment 1. A program for realizing each processing step in the flowchart of FIG. 1B is stored in the hard disk 905. The CPU 902 reads out the program therefrom and executes it.

First, the CPU 902 selects a left upper corner of the SLO image as an extraction candidate region. The optometrist 904 preliminarily decides a size of extraction candidate region and stores into the memory 903. Also in the embodiment, the size and shape of the extraction candidate region are not particularly limited but may be a size larger than such an area that the blood vessel crossing/branching portion is located. In a manner similar to the embodiment 1, the size of extraction candidate region is set to 140 pixels (in the vertical direction)×140 pixels (in the lateral direction). Steps 101 and 102 are fundamentally the same as steps 101 and 102 in FIG. 1A in the embodiment 1. However, if the CPU 902 determines in step 102 that there are three or more outer circumferential small regions where the blood vessel runs, it advances to step 107 in the embodiment 2.

Step 107 is a blood vessel determining step in which the CPU 902 discriminates whether or not the blood vessel runs in a center small region of the extraction candidate region. The center small region is a square region having the same center of gravity as that of the extraction candidate region. The optometrist 904 can arbitrarily decide the size of center small region. It is desirable that the center small region has a width similar to the diameter of blood vessel. In the embodiment, since the diameter of blood vessel is equal to about 20 pixels as mentioned above, the optometrist 904 decides that the size of center small region is equal to 20×20 pixels, and stores into the memory by inputting from an input apparatus (not shown).

The CPU 902 discriminates whether or not the blood vessel runs in the center small region of the extraction candidate region by the following method. First, the CPU 902 averages the luminance of each pixel in the center small region and obtains an average value. The average value is compared with a third threshold value D which has previously been stored in the memory by the optometrist 904. When the average value is equal to or less than the third threshold value D, it is determined that the blood vessel runs in the center small region.

The optometrist 904 can arbitrarily decide the third threshold value D. In the embodiment, the optometrist 904 determines that the third threshold value D is set to −10000 which is equal to the second threshold value B that is used in the case of discriminating whether or not the blood vessel exists in the outer circumferential small region. If the CPU 902 decides that the blood vessel runs in the center small region, the processing routine advances to step 103. If the CPU 902 decides that the blood vessel does not run in the center small region, the extraction candidate region is deviated (step 106) and the processing routine is returned to step 101.

Figure 4B:
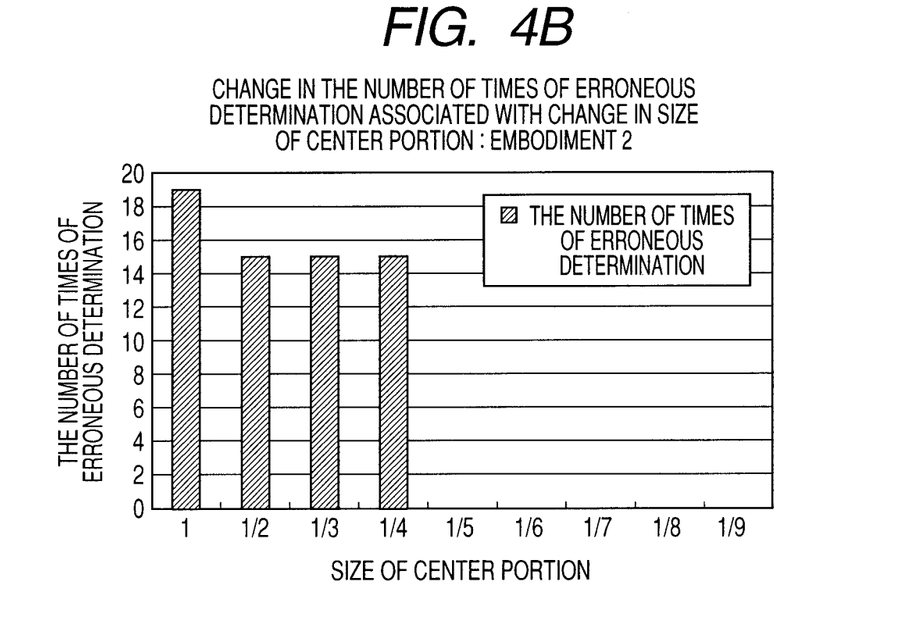
FIG. 4B is a graph illustrating the number of times of erroneous determination depending on a size of center portion in step 103 in the embodiment 2.

Processes in step 103 and subsequent steps are similar to those in the embodiment 1. With respect to "center portion" in step 103, the number of times of erroneous determination among the extraction candidate regions extracted as crossing/branching portions of the blood vessel in the center portion of each size is measured in a manner similar to the embodiment 1 (FIG. 4B). Thus, it will be understood that it is desirable that "center portion" is a region having a size which is equal to or less than 1/5 (is equal to or larger than 1/9) of the size of extraction candidate region. Further, it will be understood that when the size of center portion is equal to or less than 1/5 (is equal to or larger than 1/9) of the size of extraction candidate region, the erroneous determination is not detected and, in the embodiment, the crossing/branching portion of the blood vessel can be extracted accurately more than the embodiment 1. In the embodiment, the optometrist 904 determines the region which has a size of 1/7 of the extraction candidate region and in which a center of gravity is equal to the center of gravity of the extraction candidate region as a center portion.

By constructing as mentioned above, a probability that the region in which the center of the crossing/branching portion of the blood vessel exists in the center portion of the extraction region is extracted can be raised more than that in the embodiment 1.

Embodiment 3

In the embodiment 3, a fluorescence fundus image (FA) or an indocyanine green fundus contrast image (IA) is used as a fundus image from which a crossing/branching portion of a blood vessel is extracted. In the image of FA or IA, a luminance of the blood vessel is larger than that in another region. Also in the embodiment, any fundus image can be used so long as it is a two-dimensional image in which the luminance of the blood vessel is larger than that in another region.

A procedure is almost the same as that in the embodiment 2 and the apparatus shown in FIG. 2 is similarly used. The CPU 902 executes the program which has been stored in the hard disk 905 and is used to realize the flowchart of FIG. 1B and progresses the processes. However, steps 102 and 107 in the flowchart of FIG. 1B differ from those in the embodiment 2. A description of portions which overlap with those in the embodiment 2 is omitted hereinbelow and only different portions will be described hereinbelow.

The optometrist 904 inputs the first threshold value A, second threshold value C, and third threshold value E which have previously and arbitrarily been determined from the input apparatus (not shown) and stores into the memory.

In step 102 in the flowchart of FIG. 1B, first, the CPU 902 obtains the absolute value of the difference between the luminance average values of the adjacent outer circumferential small regions. If the CPU 902 determines that the absolute value of the difference between the luminance average values is equal to or larger than the threshold value A and the larger luminance average value is equal to or larger than the threshold value C, it is decided that the blood vessel runs in the outer circumferential small region represented by the luminance average value which is equal to or larger than the threshold value C.

In step 107 in the flowchart of FIG. 1B, the CPU 902 averages the luminance of pixels in the center small region and obtains the average value. When the average value is equal to or larger than the threshold value E, the CPU 902 determines that the blood vessel runs in the center small region.

By constructing as mentioned above, even in the case where the blood vessel is photographed at a luminance higher than that in another region, an advantage similar to that in the embodiment 2 can be obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209387, filed Sep. 10, 2009, which is hereby incorporated by reference herein in its entirety.

What is claimed is:

1. An extracting method for use in an apparatus for extracting a blood vessel crossing/branching portion from an image including a blood vessel, the method comprising:
 a setting step of setting outer circumferential small regions in an outer circumferential portion of an extraction candidate region in the image;
 a center portion determining step of determining whether or not a coordinate average of outer circumferential portion blood vessels existing in at least three of the set outer circumferential small regions is included in a center portion of the extraction candidate region; and
 an extracting step of extracting the extraction candidate region as a blood vessel crossing/branching portion, when it is determined in the center portion determining step that the coordinate average is included in the center portion.

2. A method according to claim 1, further comprising:
 a number determining step of determining the number of the outer circumferential portion blood vessels,
 wherein, in the extracting step, the extraction candidate region is extracted as the blood vessel crossing/branching portion based on results of the number determining step and the center portion determining step.

3. A method according to claim 1, further comprising a blood vessel determining step of determining whether or not the blood vessel exists in the center portion of the extraction candidate region,
 wherein the extracting step extracts the extraction candidate region according to a determination result of the blood vessel determining step.

4. A method according to claim 3, wherein the blood vessel determining step makes the determination by comparing an average value of a luminance value of each pixel included in the center portion of the extraction candidate region with a predetermined third threshold value.

5. A method according to claim 2, wherein the extraction candidate region is a region having such a size that the crossing/branching portion of the blood vessel in the image is included, and the size of the center portion is equal to or less than ⅕ of the size of the extraction candidate region.

6. A method according to claim 1, further comprising a step of making position-matching between the image which is a two-dimensional image of a fundus of an eye and another image which is a two-dimensional image of the fundus obtained in a period different from that of the image based on the blood vessel crossing/branching portion.

7. An extracting apparatus of a blood vessel crossing/branching portion, comprising:
 a memory configured to store a program;
 a processor configured to execute the program to:
   set outer circumferential small regions in an outer circumferential portion of an extraction candidate region in an image including a blood vessel;
   determine whether or not a coordinate average of outer circumferential portion blood vessels existing in at least three of the set outer circumferential small regions is included in a center portion of the extraction candidate region; and
   extract the extraction candidate region as a blood vessel crossing/branching portion, when it is determined that the coordinate average is included in the center portion.

8. A non-transitory computer-readable storage medium storing a computer-executable program for causing a computer to execute the method according to claim 1.

9. A method according to claim 2, wherein the number determining step makes the determination by comparing an absolute value of a difference between luminance average values of adjacent outer circumferential small regions with a predetermined first threshold value, and further comparing the luminance average values of the adjacent outer circumferential small regions with a predetermined second threshold value.

10. An extracting apparatus according to claim 7, wherein the processor is further configured to execute the program to obtain the coordinate average.

11. An extracting apparatus according to claim 7, wherein the processor is further configured to execute the program to determine a number of the outer circumferential portion blood vessels,
 wherein the extraction candidate region is extracted as the blood vessel crossing/branching portion based on results of the determined number of the outer circumferential portion blood vessels and whether the coordinate average is included in the center portion.

12. An extracting apparatus according to claim 7, wherein the processor is further configured to execute the program to make position-matching between the image which is a two-dimensional image of the fundus of an eye and another image which is a two-dimensional image of the fundus obtained in a period different than that of the image based on the blood vessel crossing/branching portion.

13. A method according to claim 1, wherein the size of the center portion is equal to or less than ⅓ of the size of the extraction candidate region.

14. A method according to claim 1, wherein the size of the center portion is equal to or less than ⅕ of the size of the extraction candidate region.

15. The method according to claim 1, wherein the setting step, the center portion determining step, and the extracting step are executed in this sequential order for a new extraction candidate region different from the extraction candidate region in the image.

16. The extracting apparatus according to claim 7, wherein the processor executes the program to set the outer circumferential small regions, determine whether or not the average is included in the center portion, and extract the extraction candidate region as a blood vessel crossing/branching portion in this sequential order for a new extraction candidate region different from the extraction candidate region in the image.

* * * * *